US006949190B2

(12) United States Patent
Hutzler

(10) Patent No.: US 6,949,190 B2
(45) Date of Patent: Sep. 27, 2005

(54) DEVICE COMBINING 3 FUNCTIONS IN ONE FOR WASHING, SERVING AND STORING BERRIES, GRAPES, AND OTHER FRUITS

(75) Inventor: Lawrence R. Hutzler, Lakeville, CT (US)

(73) Assignee: Hutzler Manufacturing Co., Inc., Canaan, CT (US)

( * ) Notice: Subject to any disclaimer, the term of this patent is extended or adjusted under 35 U.S.C. 154(b) by 50 days.

(21) Appl. No.: 10/319,250

(22) Filed: Dec. 13, 2002

(65) Prior Publication Data

US 2004/0112821 A1 Jun. 17, 2004

(51) Int. Cl.[7] ................................................. A47J 43/22
(52) U.S. Cl. ..................... 210/248; 210/474; 99/508; 220/676; 220/607
(58) Field of Search ................................. 210/238, 470, 210/482, 474, 248, 465; 99/413, 508; D7/667, 668; 220/DIG. 6, 676, 607

(56) References Cited

U.S. PATENT DOCUMENTS

| 136,135 | A | * | 2/1873 | Plughoff | ..................... 68/173 |
|---|---|---|---|---|---|
| 2,040,004 | A | * | 5/1936 | Kelsay | ..................... 126/369 |
| D390,757 | S | * | 2/1998 | Wold et al. | ..................... D7/667 |
| D403,210 | S | * | 12/1998 | Licari | ..................... D7/667 |
| D424,381 | S | * | 5/2000 | Terenzio | ..................... D7/667 |
| D425,378 | S | * | 5/2000 | Gilbertson | ..................... D7/667 |
| 6,568,314 | B1 | * | 5/2003 | Stepanova | ..................... 99/340 |

* cited by examiner

Primary Examiner—Terry K. Cecil
(74) Attorney, Agent, or Firm—Michael J. Striker

(57) ABSTRACT

A device for washing, serving and storing berries, grapes and other fruits, etc. has a first container provided with a plurality of throughgoing openings so that when berries, grapes and other fruits, etc. are deposited in an interior of the first container and water is poured into it for washing berries, grapes and other fruits, etc., after washing water can flow out of the first container, and a second container which is substantially solid and formed so that the first container can be inserted into the second container so that water flowing out of the first container is accumulated in an interior of the second container and thereby the water is substantially removed from the berries, grapes and other fruits, etc. located in the interior of the first container, so that the device can be used for washing, serving and storing the berries, grapes and other fruits,etc.

11 Claims, 6 Drawing Sheets

DEVICE COMBINING 3 FUNCTIONS IN ONE FOR WASHING, SERVING AND STORING BERRIES, GRAPES, AND OTHER FRUITS

BACKGROUND OF THE INVENTION

The present invention relates to a device for washing, serving and storing berries, grapes and other fruits. The problem that was desired to be solved by this device was to prevent the berries, grapes and other fruits, etc. from spoiling by sitting in the water that is draining off of the washed berries.

Devices for washing berries, etc. are known. One of such devices is formed as a solid container into which berries can be thrown and water can be poured, so that by moving the container the water with the berries is agitated and berries are washed. With such a container it is necessary to remove water by tilting the container and slowly pouring water out of the container, which is of course a certain inconvenience. All of the water can never be removed and if the berries are not consumed quickly they will begin to spoil. Another device for this purpose includes a perforated container, a colander, in which berries can be thrown and then water flows so as to wash the berries and the like. The disadvantage of this device is that when it is necessary to serve the washed berries and the container is moved to a table and the like, water still drips from the container. It is therefore believed that the existing devices of this type can be further improved.

SUMMARY OF THE INVENTION

Accordingly, it is an object of the present invention to provide a device for washing, serving and storing berries, grapes and other fruits, etc. which is a further improvement of the existing devices.

In keeping with these objects and with others which will become apparent hereinafter, one feature of the present invention resides, briefly stated, in a device for washing, serving and storing berries, grapes, and other fruits etc. This product is comprised of a first container provided with a plurality of throughgoing openings so that when berries, grapes and other fruits, etc. are deposited in the interior of the first container, and water is poured therein for washing the berries, grapes and other fruits, etc. After washing, water can flow out of said first container. A second container which is substantially solid and formed so that said first container can be inserted into said second container. Any excess water which is continuously flowing out of the first container is then accumulated in an interior of said second container. The water is substantially removed from the berries, etc. located in the interior of said first container so that the device can be used for washing, serving and storing of berries, grapes and other fruits, etc.

When the device is designed in accordance with the present invention, it eliminates the disadvantages of the prior art. It is a multi-purpose device for washing, serving and storing of berries, grapes and other fruits, etc. in the same device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
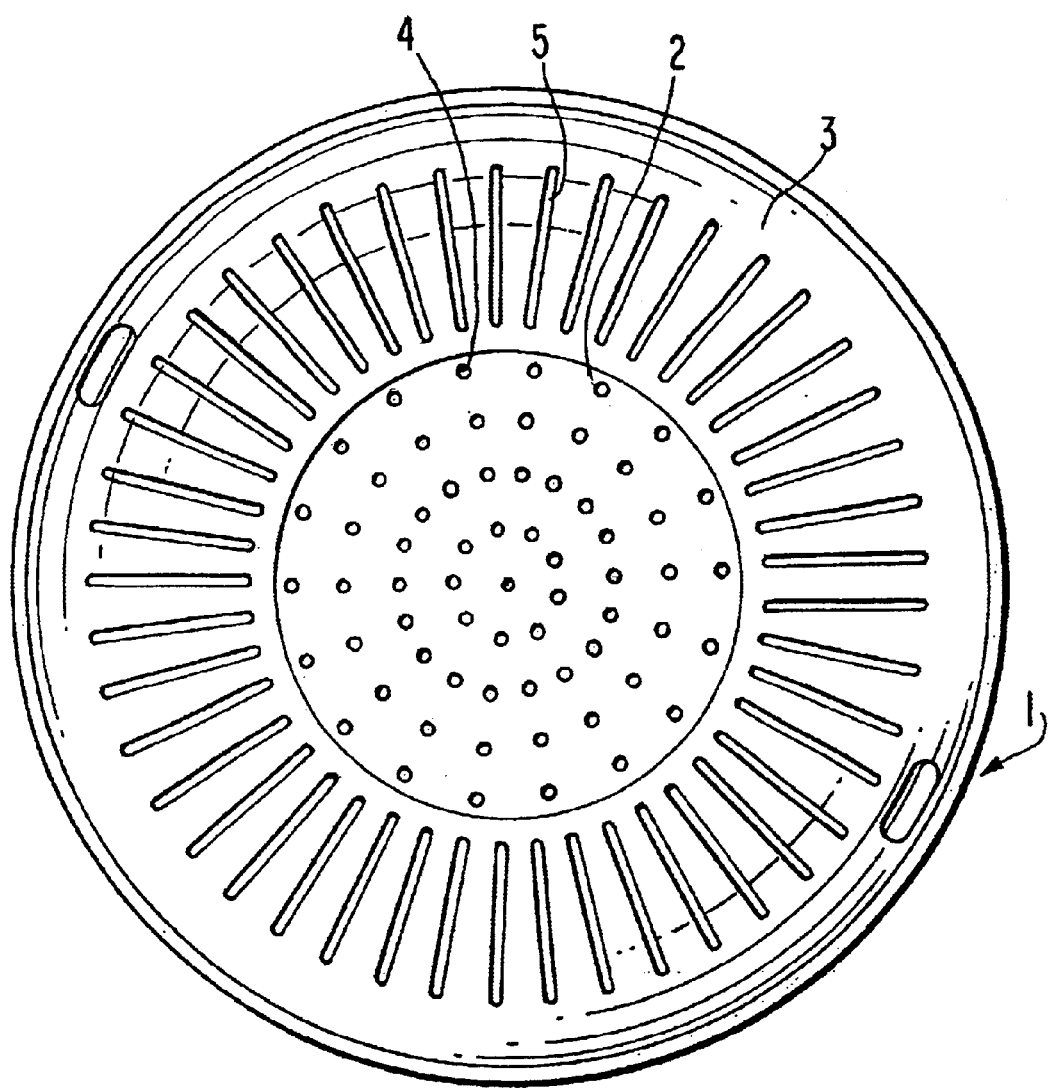
FIG. 2 is a plan view of the container shown in FIG. 1.
Figure 3:
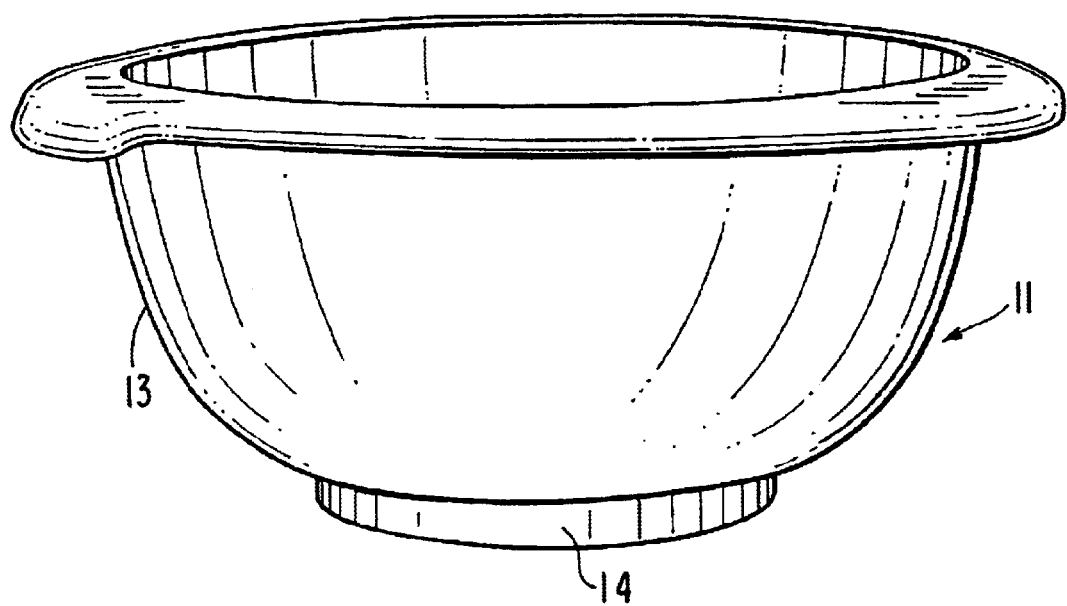
FIG. 3 is a perspective view of a second container of the inventive device for washing, serving and storing berries grapes and other fruits, etc.

A device for washing, serving and storing berries, grapes and other fruits, etc. has a first container which is identified as a whole with reference numeral 1. The first container has a bottom 2 and a side wall 3 connected with one another, for example integrally of one piece with one another. The bottom 2 of the first container 1 has a plurality of throughgoing openings which are identified with reference numerals 4 and formed as substantially circular holes. The side wall 3 of the container 1 also has a plurality of throughgoing openings which are identified with reference numeral 5 and formed as elongated slots. As can be seen from FIG. 2 the holes 4 and the slots 5 extend in a substantially radial direction or along corresponding radii. The circular holes 4 in each radial row are also respectively arranged along concentric circles about a central hole coinciding with the bottom wall central axis. The slots 5 are located denser in a circumferential direction than the holes 4. In other words, there are more radial slots 5 than radial rows of holes 4, as can be seen from FIG. 2. Between two slots 5 which correspond to the positions of two rows of openings 4, there is one additional slot.

When the holes 4 and the slots 5 are designed as explained herein above, an optimal flow of water from the berries is provided from the interior of the container 1 to its exterior through the holes 4 and the slots 5.

Figure 1:
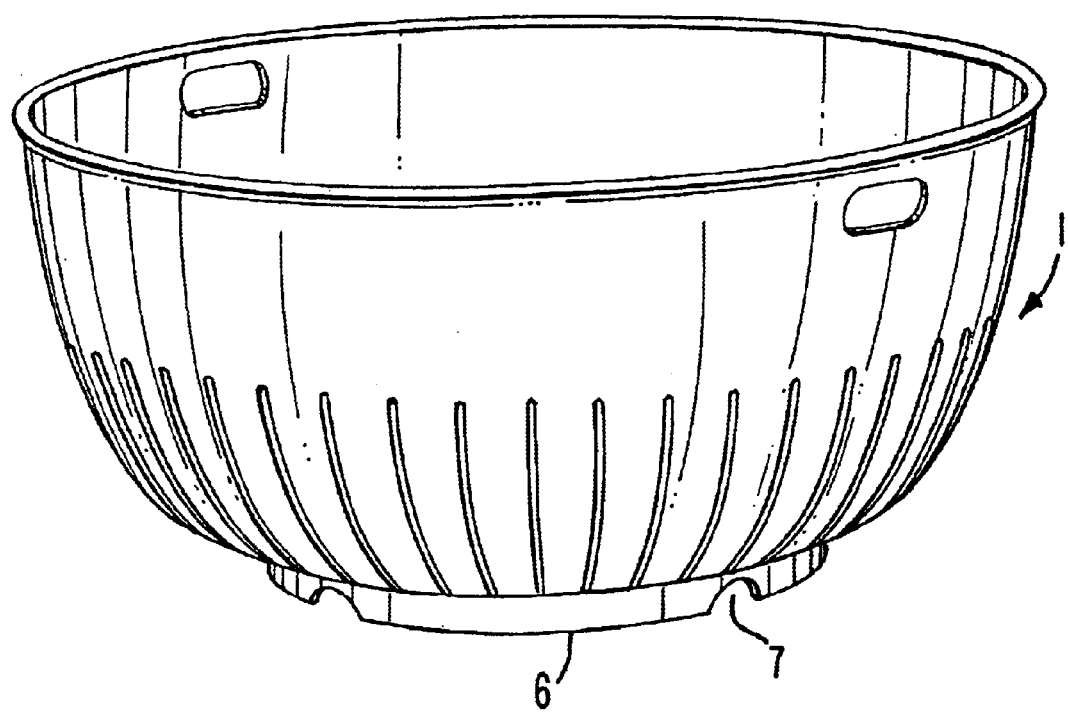
FIG. 1 is a perspective view of a first container of a device for washing, serving and storing berries grapes and other fruits, etc. in accordance with the present invention.

As can be seen from FIG. 1, the container 1 has a support 6, the purpose of which will be explained herein below. The support 6 is provided with a plurality of transverse throughgoing channels 7 which are distributed over the periphery of the support and allow passage of water there through.

Figure 4:
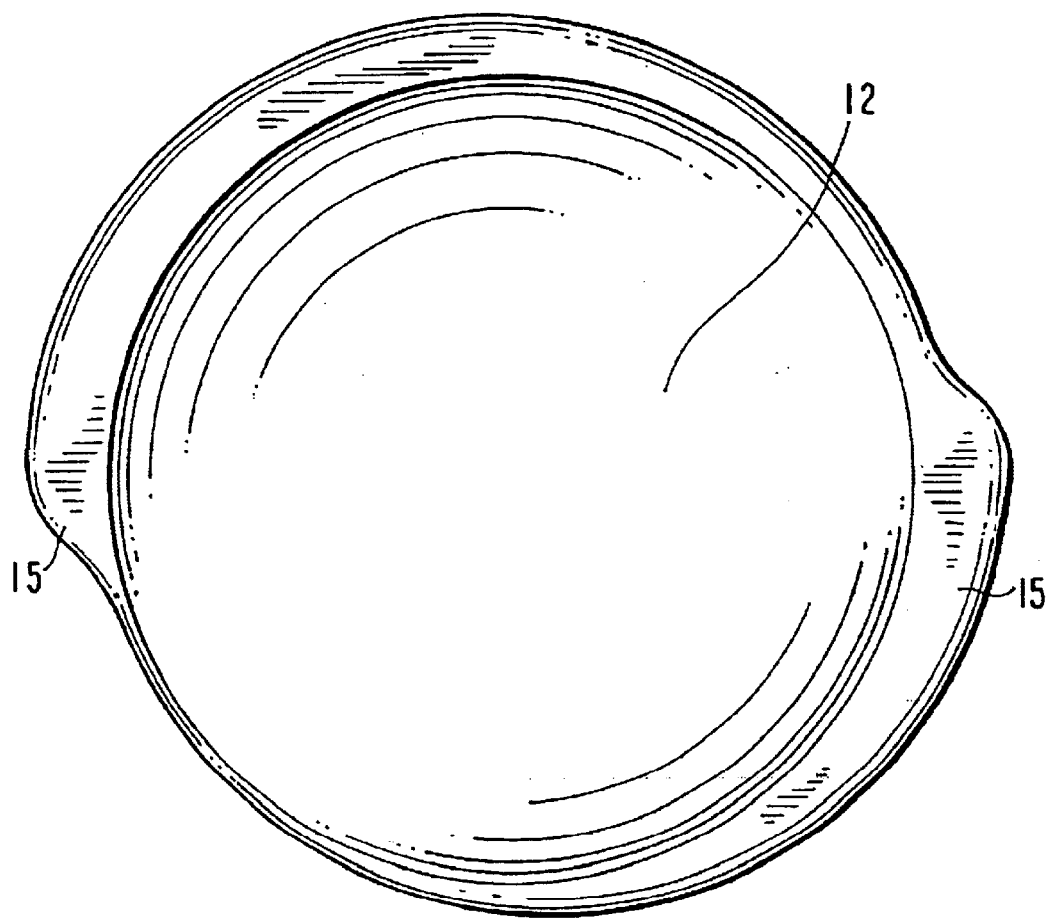
FIG. 4 is a plan view of the container FIG. 3 of the inventive device.

The device in accordance with the present invention has a second container which is identified as a whole with reference numeral 11. The container 11 has a bottom 12 and a curved side wall 13. It is also provided with a support 14. The container 1 is formed as a solid container without any throughgoing openings, and its elements 12, 13 and 14 are formed integrally of one piece with one another. The container 11 further has two radially opposite projections 15 which form handles for taking the container by hand and transporting it when necessary. The handles 15 have a width on the plan view of FIG. 4, which reduces in a circumferential direction.

Figure 7:
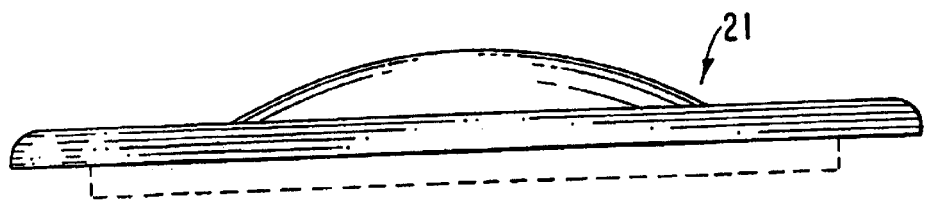
FIG. 7 is a side view of the cover of the inventive device.

Finally, the device for washing, serving and storing berries, grapes and other fruits, etc. in accordance with the present invention has a cover which is identified with reference numeral 21. The cover has a central area which can be formed convex upwardly, and two diametrically opposite projections 23 which form handles. The width of the projections 23 reduces in a circumferential direction. The cover 6 has a portion which tightly fits into the inner container 1, as shown in FIG. 7. The projections 23 of the cover 21 are located in the areas between the projections 15 of the cover 11.

The device for washing, serving and storing berries, grapes and other fruits, etc. operates in the following manner.

Figure 5:
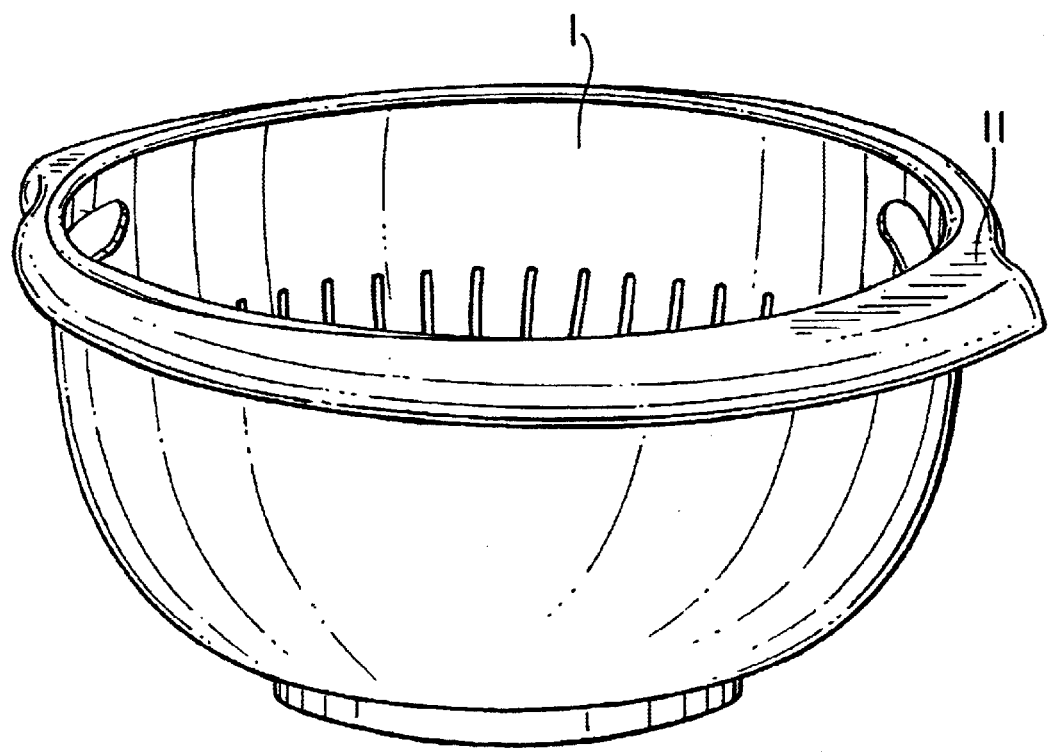
FIG. 5 is a view showing the first and second containers assembled with one another.
Figure 6:
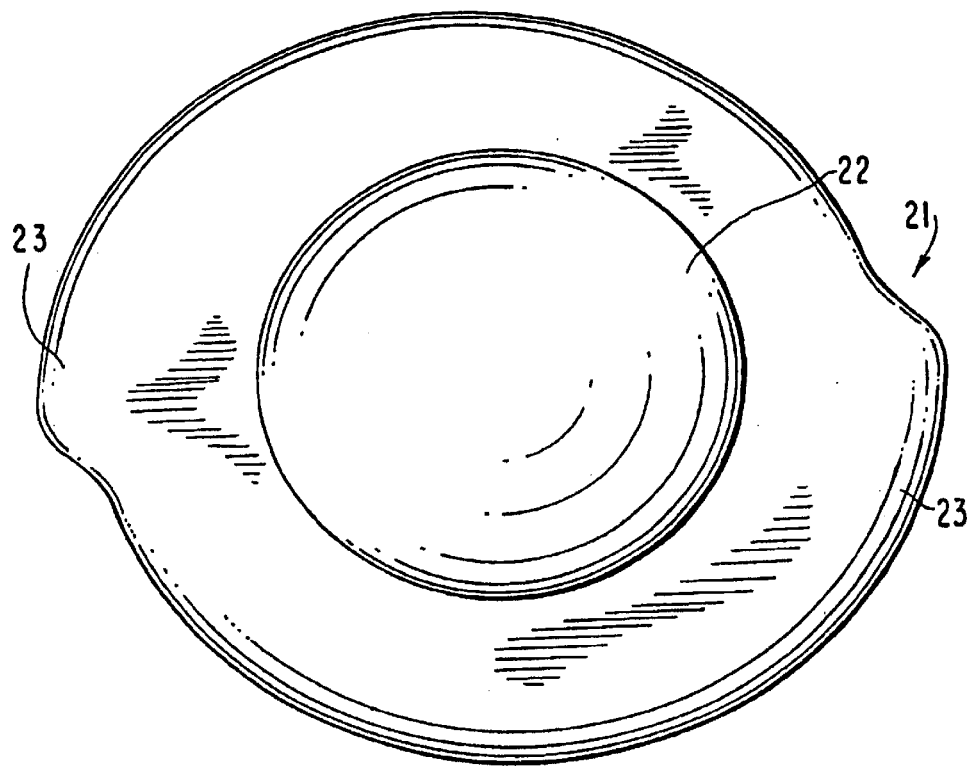
FIG. 6 is a view showing the cover of the device for washing, serving and storing berries, grapes and other fruits, etc. in accordance with the present invention.

As shown in FIG. 5, the inner container 1 is inserted into the outer container 11 so that the inner container 1 stands with its support 6 on the top surface of the bottom of the outer container 11. Then berries, grapes and other fruits, etc. are introduced into the interior of the inner container 1 and water is poured over the berries, grapes and other fruits, etc. The berries, grapes and other fruits, etc. are thoroughly washed in the inner container 1, while water flows through the holes 4 and slots 5 outwardly in a space between the containers 1 and 11. Since the water does not spill outside, the device including the containers 1 and 11 assembled with one another can be placed on a table and the like, and berries, grapes and other fruits, etc., and berries can be served. When some berries, grapes and other fruits, etc. remain uneaten, the cover 21 can be introduced tightly into the container 1 and closes the device, and the berries, grapes, other fruits, etc. other can be stored. By allowing any excess water to continuously drain will prevent the berries from sitting in water and spoiling.

It can be seen that the inventive device is a multi-function device, which is used for washing, serving and storing of berries, grapes and other fruits, etc.

It will be understood that each of the elements described above, or two or more together, may also find a useful application in other types of constructions differing from the types described above.

While the invention has been illustrated and described as embodied in device for washing berries, grapes and other fruits, etc., it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for washing, serving and storing fruits, comprising a first container provided with a plurality of throughgoing openings so that when fruits are deposited in an interior of the first container and water is poured into it for washing fruits, after washing water can flow out of said first container; and a second container which is substantiaiiy solid and formed so that said first container can be inserted into said second container so that water flowing out of said first container is accumulated in an interior of said second container and thereby the water is substantially and continuously removed from the fruits located in the interior of said first container, so that the device can be used for washing, serving and storing the fruits, said first container having a substantially flat bottom wall having a central axis and a side wall which is curved in an upward radial direction, some of said throughgoing openings being provided on said bottom wall and consisting of radial rows, of at least four circular holes, which are arranged on said bottom circumferentially around said central axis, wherein the first circular hole of each radial row is a common circular hole coinciding with said central axis and wherein each of the other three circular holes of said radial rows are also respectively arranged over concentric circles on said bottom about said axis, while the rest of said curved side wall and consist exclusively of upwardly radially extending single elongated slots spaced from one another in a circumferential direction so as to surround said bottom and each extending substantially upright over a part of said curved side wall, said elongated slots being located in the circumferential direction denser than said holes.

2. A device as defined in claim 1, wherein said second container is provided with means for transportation.

3. A device as defined in claim 2, wherein said means include two projections formed at diametrically opposite sides on an upper edge of said second container.

4. A device as defined in claim 3, wherein said projections have a width reducing in a circumferential direction.

5. A device as defined in claim 1, wherein said first container has a support located under said bottom so that said first container can stand on a bottom of said second container through said support.

6. A device as defined in claim 5, wherein said support has transverse throughgoing channels through which water can flow.

7. A device as defined in claim 6, wherein said channels are distributed over the periphery of said support.

8. A device as defined in claim 1, and further comprising a cover which covers said containers when said first container is located in said second container.

9. A device as defined in claim 8, wherein said cover has projections which are spaced from one another in diametrically opposite directions.

10. A device as defined in claim 1, wherein said elongated slots in said curved side wall and said circular holes in said substantially flat bottom wall are arranged so that between two of said slots corresponding to positions of two rows of said circular holes, there is one additional slot.

11. A device for washing, serving and storing fruits, having an axis and comprising a first container provided with a plurality of throughgoing openings so that when fruits are deposited in an interior of the first container and water is poured into it for washing fruits, after washing water can flow out of said first container; and a second container which is substantially solid and formed so that said first container can be inserted into said second container so that water flowing out of said first container is accumulated in an interior of said second container and thereby the water is substantially and continuously removed from the fruits located in the interior of said first container, so that the device can be used for washing, serving and storing the fruits, said second container being provided with means for transportation which include two projections formed at diametrically opposite sides on an upper edge of said second container and each having a width reducing in a circumferential direction; and a substantially flat cover which covers said containers within said first container located in said second container, said cover having two projections formed at diametrically opposite sides substantially in a horizontal plane of said cover and each having a width reducing in a circumferential direction, said two projections of said second container being located between said two projections of said cover when considered in a circumferential direction, said first container having a substantially flat bottom wall having a central axis and a side wall which is curved in an upward radial direction, some of said throughgoing openings being provided on said bottom wall and consisting of radial rows, of at least four circular holes, which are arranged on said bottom circumferentially around said central axis, wherein the first circular hole of each radial row is a common circular hole coinciding with said central axis and wherein each of the other three circular holes of said radial rows are also respectively arranged over concentric circles on said bottom about said axis, while the rest of said throughgoing openings are provided on said curved side wall and consist exclusively of upwardly radially extending single elongated slots spaced from one another in a circumferential direction so as to surround said bottom and each extending substantially upright over a part of said curved side wall, said elongated slots being located in the circumferential direction denser than said holes.

* * * * *